US007308269B2

(12) United States Patent
Laitinen et al.

(10) Patent No.: US 7,308,269 B2
(45) Date of Patent: *Dec. 11, 2007

(54) PUSH CONTENT FILTERING FOR SHORT RANGE COMMUNICATION

(75) Inventors: Timo M. Laitinen, Tampere (FI); Jarkko Lempiö, Tampere (FI); Tomi Heinonen, Tampere (FI); Mikko Rautiainen, Tampere (FI); Ari Aarnio, Espoo (FI)

(73) Assignee: Nokia Corporation, Espoo (FI)

( * ) Notice: Subject to any disclaimer, the term of this patent is extended or adjusted under 35 U.S.C. 154(b) by 442 days.

This patent is subject to a terminal disclaimer.

(21) Appl. No.: 10/858,664

(22) Filed: Jun. 2, 2004

(65) Prior Publication Data
US 2004/0219882 A1 Nov. 4, 2004

Related U.S. Application Data

(63) Continuation of application No. 09/794,373, filed on Feb. 27, 2001, now Pat. No. 6,778,834.

(51) Int. Cl.
*H04Q 7/20* (2006.01)
*H04Q 7/00* (2006.01)
*H04Q 1/30* (2006.01)
*G08B 5/22* (2006.01)

(52) U.S. Cl. .............. 455/450; 455/456; 370/7.52
(58) Field of Classification Search ............... 455/456, 455/450; 340/825.44, 7.52
See application file for complete search history.

(56) References Cited

U.S. PATENT DOCUMENTS

| 4,748,655 | A | * | 5/1988 | Thrower et al. ............ 455/461 |
| 5,128,981 | A | | 7/1992 | Tsukamoto et al. |
| 5,673,322 | A | | 9/1997 | Pepe et al. |
| 6,157,935 | A | | 12/2000 | Tran et al. |
| 6,202,060 | B1 | | 3/2001 | Tran |
| 6,211,795 | B1 | * | 4/2001 | Izuta ......................... 340/7.52 |
| 6,219,696 | B1 | | 4/2001 | Wynblatt et al. |
| 6,289,464 | B1 | | 9/2001 | Wecker et al. |
| 6,477,529 | B1 | | 11/2002 | Mousseau et al. |
| 6,535,855 | B1 | | 3/2003 | Cahill et al. |
| 6,549,625 | B1 | | 4/2003 | Rautila et al. |
| 6,714,797 | B1 | | 3/2004 | Rautila |
| 6,778,834 | B2 | * | 8/2004 | Laitinen et al. ............. 455/450 |

(Continued)

FOREIGN PATENT DOCUMENTS

CN           1197356         10/1998

(Continued)

OTHER PUBLICATIONS

Office Action issued by the Chinese Patent Office on Oct. 28, 2005 for the corresponding Chinese Patent Application No. 02807200.6.

*Primary Examiner*—William D. Cumming
(74) *Attorney, Agent, or Firm*—Alston & Bird LLP

(57) ABSTRACT

The user of a mobile terminal capable of receiving low-power, short-range transmissions enters keywords indicative of messages the user wishes to peruse. When the mobile terminal receives a short-range transmission having a message, keywords associated with the message are compared with the user-entered keywords; if any match, a banner portion of the message is displayed on the mobile terminal and the mobile terminal issues a sensible alert. The user may request to view the message body associated with the banner portion. The user may request to take actions regarding the message body, such as storing the message body in the mobile terminal or calling a telephone number contained in the message body.

71 Claims, 11 Drawing Sheets

U.S. PATENT DOCUMENTS

| | | |
|---|---|---|
| 2002/0069220 A1 | 6/2002 | Tran |
| 2002/0160805 A1 | 10/2002 | Laitinen et al. |
| 2003/0137536 A1 | 7/2003 | Hugh |
| 2003/0182435 A1 | 9/2003 | Redlich et al. |

FOREIGN PATENT DOCUMENTS

| | | |
|---|---|---|
| CN | 1261242 | 7/2000 |
| JP | 11-110401 | 4/1999 |
| WO | WO 97/10558 | 3/1997 |
| WO | WO 99/35778 | 7/1999 |
| WO | WO 99/54827 | 10/1999 |
| WO | WO 99/65256 | 12/1999 |
| WO | WO 00/59167 | 10/2000 |
| WO | WO 01/06748 A1 | 1/2001 |

* cited by examiner

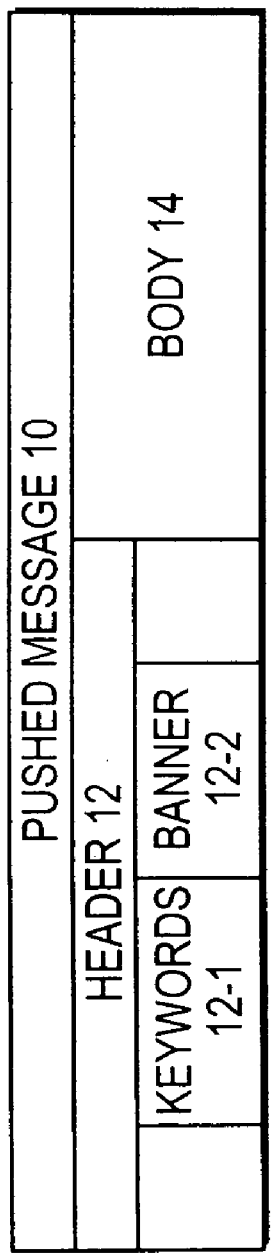
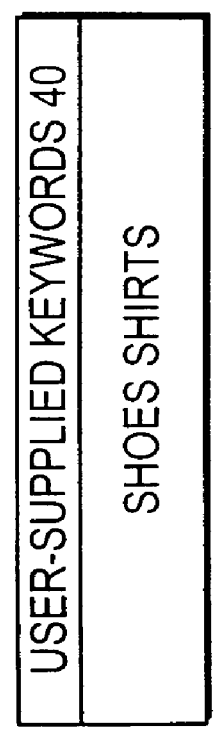
FIG. 1
FIG. 2

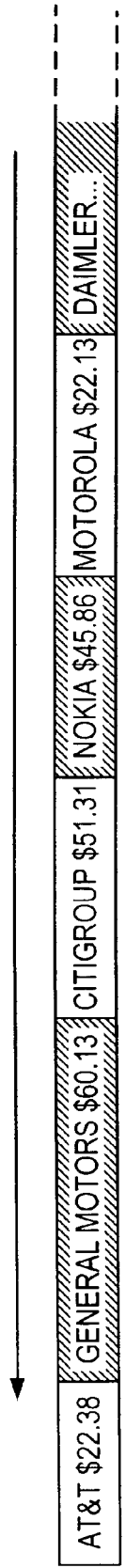
FIG. 6A
FIG. 6B

PUSH CONTENT FILTERING FOR SHORT RANGE COMMUNICATION

CROSS-REFERENCE TO RELATED APPLICATIONS

The present application is a continuation of U.S. patent Ser. No. 09/794,373, filed on Feb. 27, 2001, now U.S. Pat. No. 6,778,834 from which priority is claimed under 35 U.S.C. § 120. The aforesaid patent application is incorporated by reference in its entirety.

BACKGROUND OF THE INVENTION

1. Field of the Invention

The present invention relates to wireless devices equipped to receive textual messages, and particularly to a method and system for interactively filtering textual messages pushed to wireless devices.

2. Description of the Related Art

Wireless communication devices, which are becoming ubiquitous, typically take such forms as mobile telephones, palmtop personal data assistants (PDAs), portable computers equipped with wireless modems, etc. Such devices may connect to the public wireless network and thus are able to contact telephone devices globally. Such devices may also be equipped with short-range RF communication capability, such as a capability conforming to the BLUETOOTH specification, and may then communicate with other such devices that are nearby, typically within a range of about 10 meters.

A typical wireless device includes a processor, a random-access memory (RAM), a display screen, a keyboard or at least a keypad, and signaling means for alerting the user. The keyboard or keypad may be integrated with the display, such as in a "touch screen" display.

Advertisers have seized the opportunity to send unsolicited advertising messages to such devices. This has come to be known as "pushing" of message content, as opposed to sending content a user has requested, or "pulled". An excessive volume of pushed content can become an annoyance to a user, perhaps the most egregious example being the occurrence of "spam" on the Internet. A user with a BLUETOOTH-capable mobile terminal walking through a shopping mall, for example, may be deluged with a stream of advertising messages from business establishments in the shopping mall. Although the user has the option of switching off the mobile terminal and thus ignoring all the pushed messages, some of them may of genuine interest to him or her.

International PCT Patent Application WO 99/35778, filed by Microsoft Corporation and published Jul. 15, 1999 represents a step toward filtering pushed messages. A user of a wireless device enters filter data, which is stored in the device. An incoming message may contain filter bytes in its header, which are compared with the stored filter data. If no match is detected, the message is not accepted into the wireless device. This has the drawback that if a user has allowed filter data that is no longer relevant to remain stored in the wireless device, the user is unaware of incoming messages that do not match the filter data, even though such messages might be of current interest.

Therefore there is a need for an interactive filtering system which alerts the user to incoming messages that are of particular interest while not precluding the user from receiving any incoming messages that may have some significance to him or her.

SUMMARY OF THE INVENTION

To overcome limitations in the prior art described above, and to overcome other limitations that will become apparent upon reading and understanding the present specification, the present invention discloses a system, apparatus and method for screening messages in low-power, short-range transmissions that are received on a mobile terminal.

In accordance with one embodiment of the invention a method is provided for a user of a mobile terminal to receive information in a short-range communication from a local information source, the method comprising the steps of: maintaining filter data indicative of information the mobile terminal user is desirous of viewing; receiving the short-range communication from the local information source, wherein the short-range communication comprises a message and communication data indicative of the nature of information in the short-range communication; displaying on a display of the mobile terminal at least a portion of the message in the short range communication; performing a comparison between the communication data and the filter data according to a predetermined criteria; and providing a sensible indication to the mobile terminal user if predetermined criteria between the communication data and the filter data are met within the comparison.

Another embodiment of the invention is a mobile terminal comprising: a processor; an input device connected to the processor; a storage device connected to the processor for storing at least filter data indicative of information the mobile terminal user is desirous of viewing; a short-range transceiver connected to the processor for receiving a short-range communication comprising a message and communication data indicative of the nature of information in the short-range communication, wherein said short-range communication is received from a local information source; a display connected to the processor for displaying at least a portion of the message; and filter software operative on the processor. The filter software is adapted to: direct to the display at least a portion of the message; perform a comparison between the communication data and the filter data stored on the storage device; and cause an indication sensible by the mobile terminal user if predetermined criteria between the communication data and the filter data are met within the comparison.

Another embodiment of the invention is a system in a mobile terminal for identifying matches between information a user of the mobile terminal is desirous of viewing and a received short-range communication, the system comprising: a processor; a storage device; a display; and software means operative on the processor. The received short-range communication comprises a message and communication data indicative of the nature of information in the short-range communication. The software means is adapted to: maintain in the storage device a database of keywords identifying the information the mobile terminal user is desirous of viewing; display at least a portion of the message in the short-range communication; scan the communication data in the short-range communication to find matches between the communication data and the keywords stored in the storage device; and provide a sensible indication to the mobile terminal user if predetermined criteria between the communication data and the keywords are met.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference numerals denote similar elements throughout the several views:

FIG. 1 is a block diagram of pertinent portions of a message sent to users of mobile terminals according to one embodiment of the present invention;

FIG. 2 shows a list in which a user enters keywords according to one embodiment of the present invention;

FIG. 6A and 6B illustrate textual information scrolling on a display according to one embodiment of the present invention;

DETAILED DESCRIPTION OF THE PRESENTLY PREFERRED EMBODIMENTS

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made without departing from the scope of the present invention.

According to one embodiment of the invention, with reference to FIG. 1, a pushed message 10 has a header portion 12 and a body 14. Body 14 contains the main content of the message. Header portion 12 includes at least a keywords portion 12-1 and a banner portion 12-2. The keywords portion 12-1 contains keywords which specify categories to which the content of the message is directed; Banner portion 12-2 contains a word or short phrase for display on the mobile terminal, preferably in one line, summarizing for the user the nature of the message. Alternatively, banner portion 12-2 might contain the entire message, and body 14 would be blank.

Referring to FIG. 2, according to one embodiment of the invention the user enters into the RAM of the mobile terminal a list 40 of keywords that are of interest to him. Entry may be effected through the keyboard or keypad on the device, or the list of keywords may have been downloaded to the device by the user from some other device, such as a home computer. Entering keywords through the keyboard might consist of typing the keywords letter by letter, or requesting presentation of a predetermined menu from which keywords may be selected. FIG. 2 shows keywords that pertain to a present exemplary scenario, but it will be understood that the list of keywords may be altered by the user at the user's discretion. Under the present example, the user wishes to purchase shoes and shirts, and therefore wishes to receive advertisements about shoes and shirts.

Figure 3A:
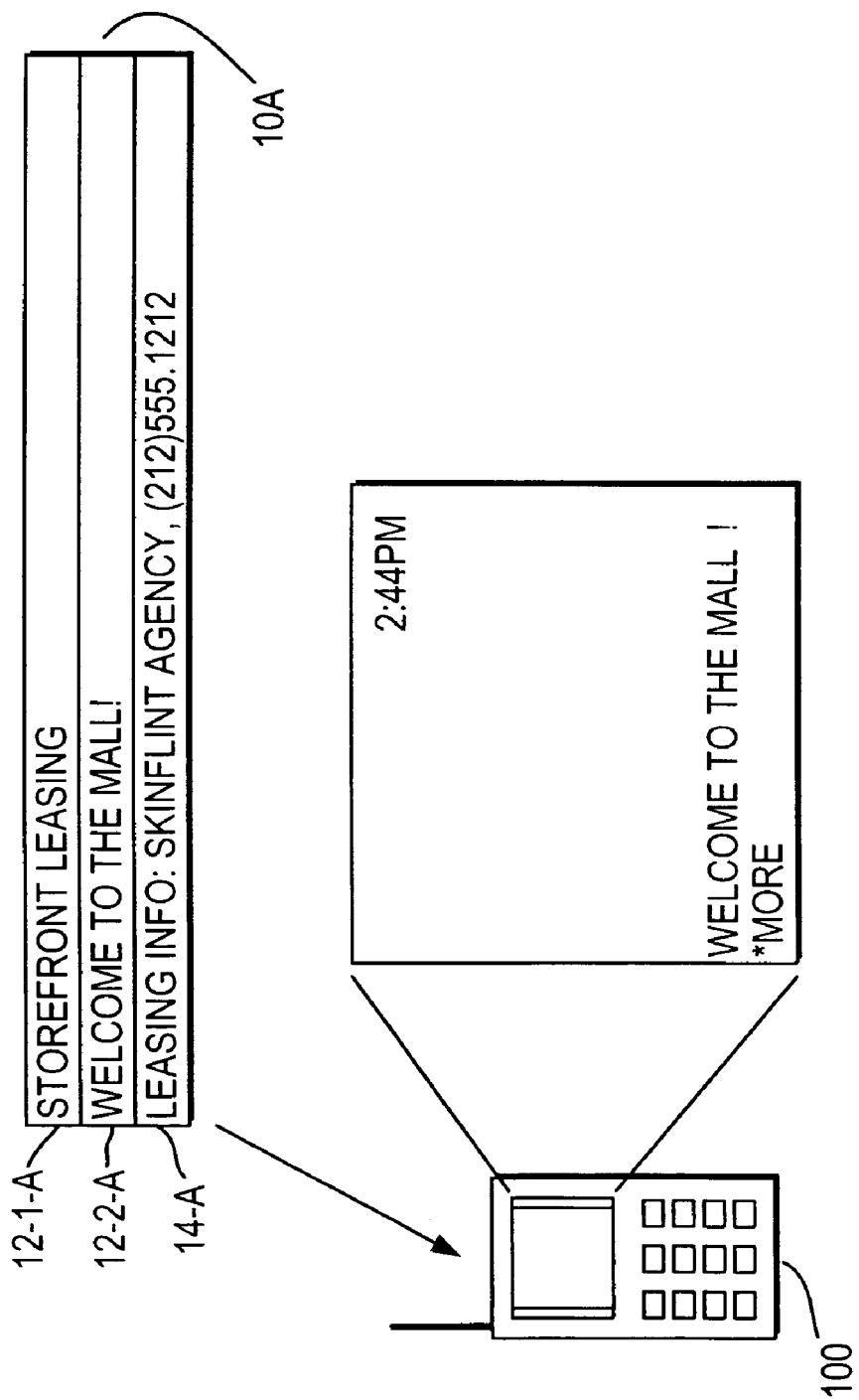
FIGS. 3A through 3D illustrate a scenario that might occur according to one embodiment of the present invention when a user of a mobile terminal enters and traverses a shopping mall.

FIGS. 3A through 3D illustrate a scenario according to one embodiment of the present invention, when a Bluetooth-capable mobile terminal carried by a user walking through a shopping mall is being subjected to many pushed messages from various business located in the shopping mall. FIG. 3A shows a message received by a user as the user enters the mall. The user's terminal 100 receives, typically from a Bluetooth transceiver located in the vicinity of the mall entrance, a message 10-A containing keywords 12-1-A, banner 12-2-A, and body 14-A. Banner 12-2-A is displayed on mobile terminal 100. Because none of the keywords 12-1-A provided in the message match keywords 40 entered by the user, no attempt is made to alert the user. The user might nevertheless observe the banner on the display, and might elect to seek more information by pressing the asterisk key on mobile terminal 100's keypad, as the user is prompted to do by the legend "* MORE" appearing on the bottom line of the display. Message content 14-A would then be displayed; in the present example, the user does not press the asterisk key. Pressing the asterisk key is but one of many possible methods that may be used to request further information.

Figure 3B:
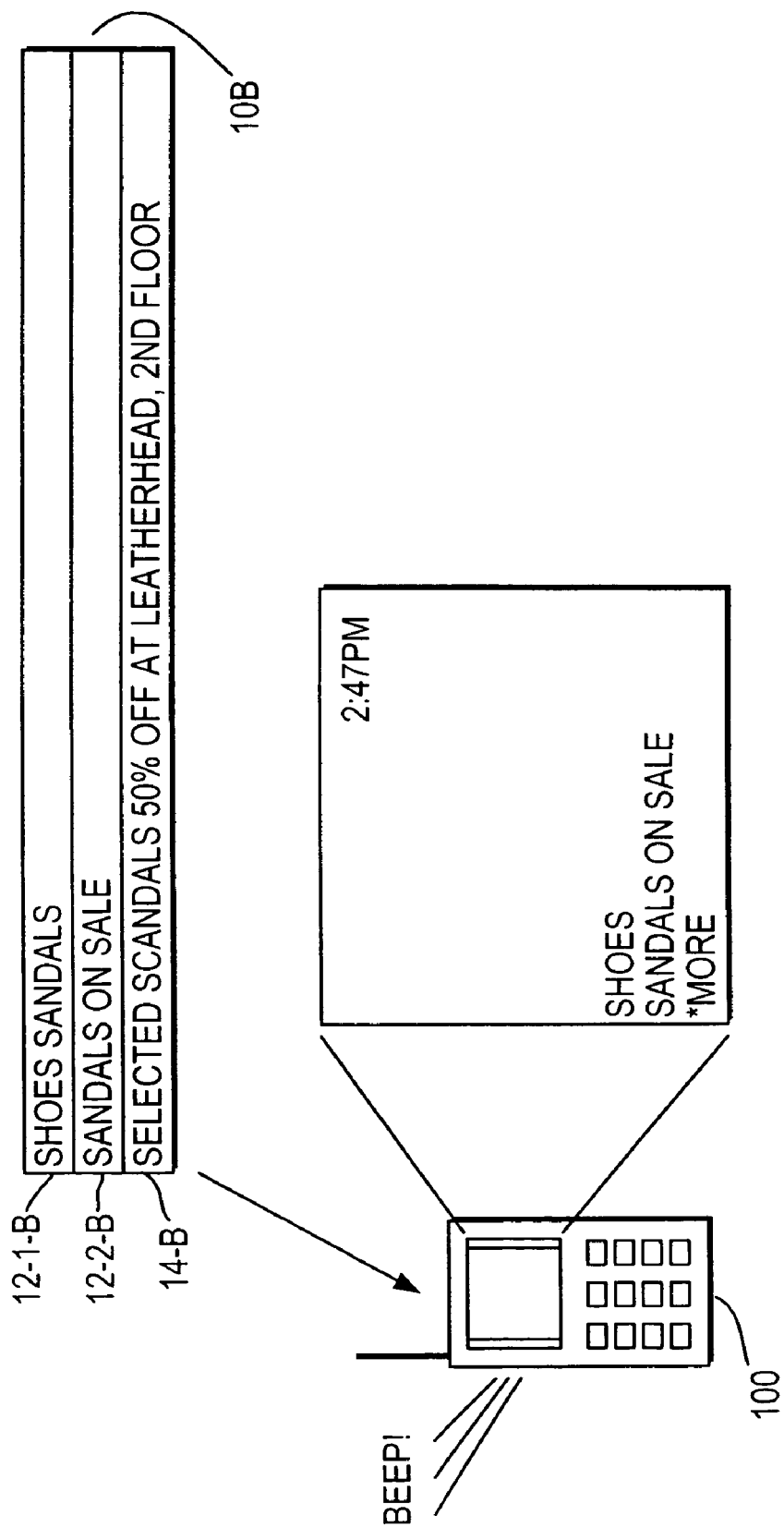

In FIG. 3B, a message 10-B received by mobile terminal 100 is shown. Banner 12-2-B is displayed on the mobile terminal 100, and because one of the keywords 12-1-B (namely, "SHOES") matches one of user-provided keywords 40, mobile terminal 100 alerts the user. In the present example this is accomplished by causing the mobile terminal 100 to beep, although in alternative embodiments this may accomplished in other ways, such as display illumination, reverse video, vibrating, or ringing. In the present example, sandals are not a kind of shoes that the user presently wishes to purchase, so the user elects not to request additional information. The matching keyword "SHOES" may also be displayed on mobile terminal 100.

Figure 3C:
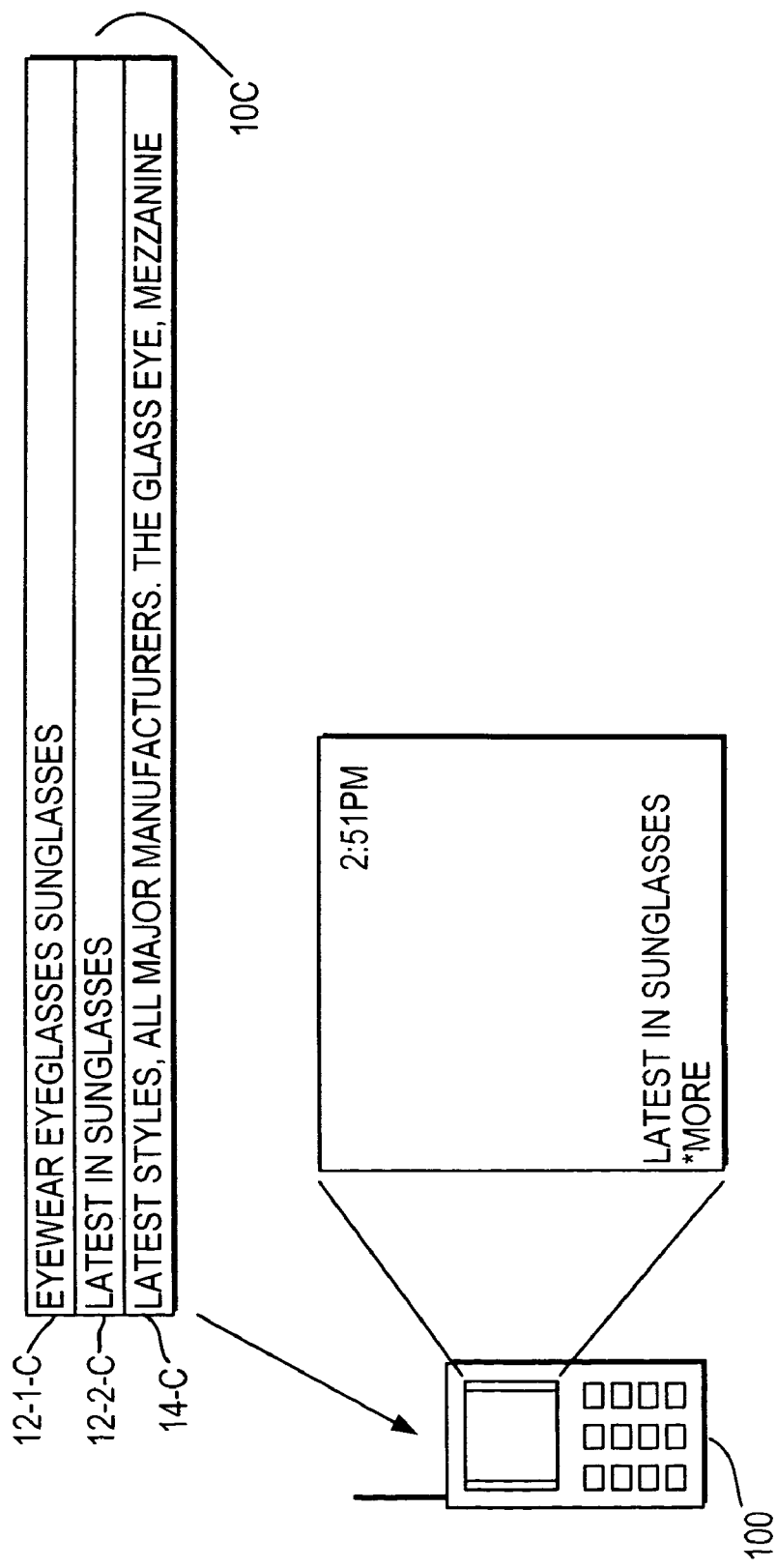

In FIG. 3C, mobile terminal 100 receives message 10-C, and displays the banner "Latest in Sunglasses". Since none of keywords 12-1-C match user-supplied keywords 40, mobile terminal 100 does not alert the user. Even if the user observes the display, the user does not request additional information in the present example because the user is not interested in the merchandise.

Figure 3D:
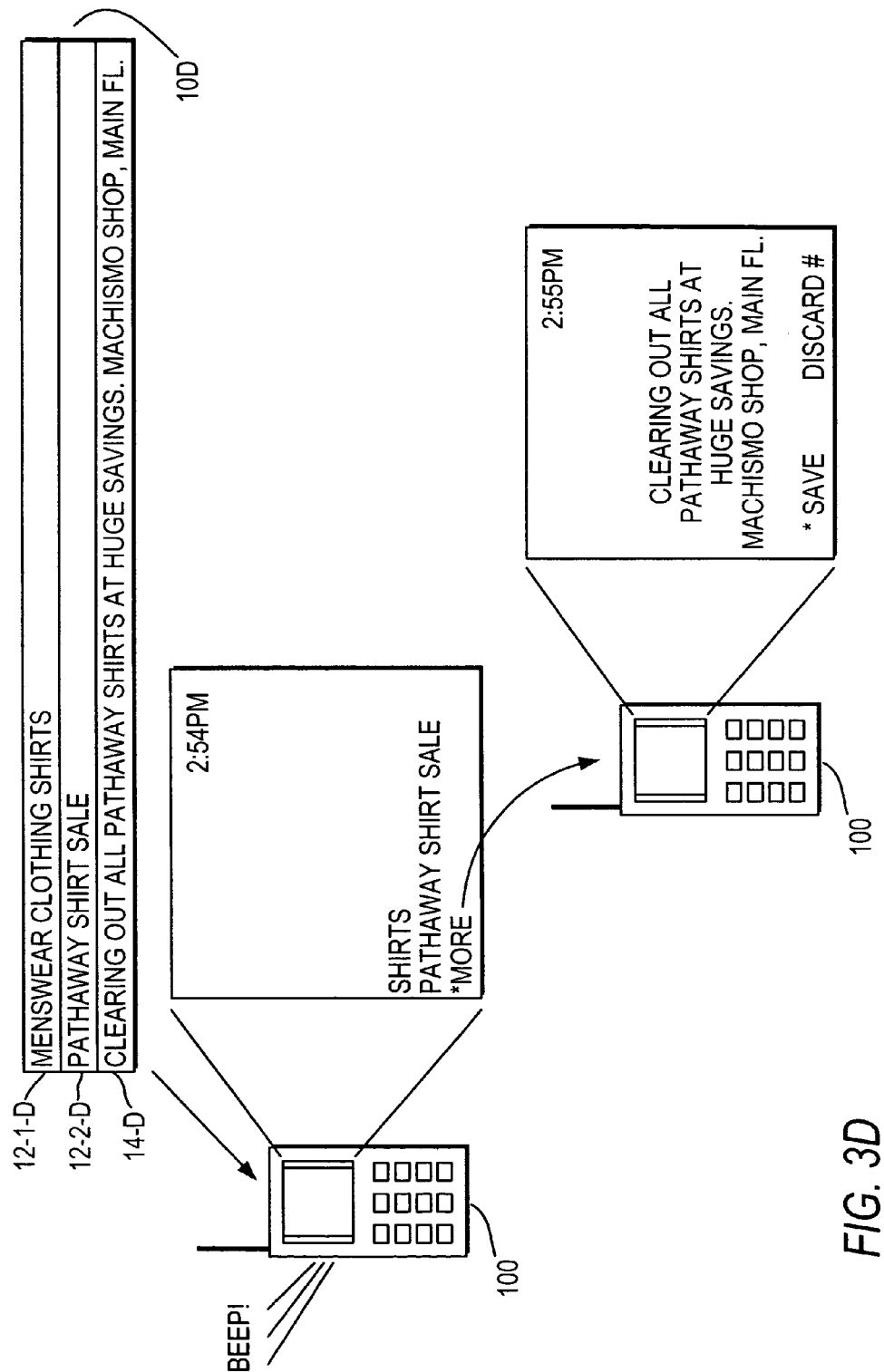

In FIG. 3D, mobile terminal 100 receives message 10-D. Banner 12-2-D is displayed on mobile terminal 100. Because one of keywords 12-1-D (namely, "SHIRTS") matches user supplied-keywords 40, mobile terminal 100 alerts the user. The matching keyword "SHIRTS" may also be displayed on mobile terminal 100. In the present example, the banner arouses the user's interest and the user wishes to learn more, so the user presses the asterisk key. Message content 14-D is then displayed on mobile terminal 100. Prompts at the bottom of the display direct the user to press the asterisk key if the user wishes to save the message, or the pound-sign key if the user does not. In an alternative embodiment, the legend "OPTIONS" is presented instead of the legend "SAVE", and, following that prompt, a submenu is displayed in which SAVE is one of the options; other options might be, for example, to dial a phone number presented in message 14-D. If the user elects to SAVE the message, a check is performed within mobile terminal 100 to determine whether there is sufficient storage space; if not, a previously stored message is deleted. Preferably, the oldest of the previously stored messages is deleted. Key entries may be provided to effect retrieval and display of the stored messages.

Figure 4:
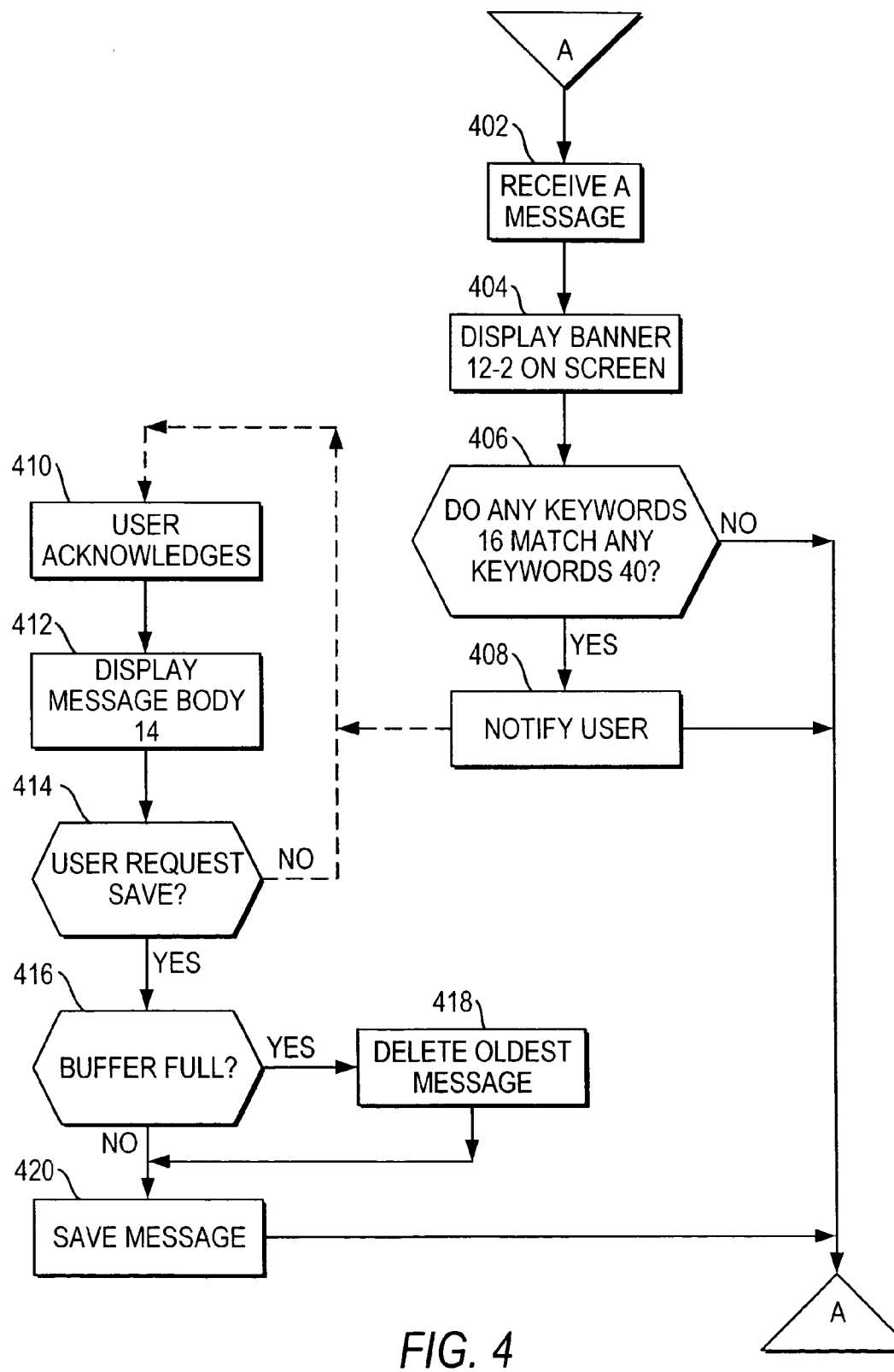
FIG. 4 is a flowchart of a process according to one embodiment of the present invention.

According to one embodiment of the invention, FIG. 4 is a flowchart of a process to be followed in a mobile terminal according to the present invention. The process is initiated when block 402 detects that a message 10 is received by the mobile terminal. In a scenario represented in FIGS. 3A-3D the push message is sent using BLUETOOTH technology, developed for low-power short-range RF communication. In block 404, the banner 12-2 from the message 10 is displayed on the mobile terminal. In block 406 a check is performed of whether any keywords 12-2 in the message match any of the user's stored keywords 40. If not, the process goes back to wait at block 402 for receipt of a new message. (The banner 12-2 remains on the screen until replaced.) If there is a keyword match, at block 408 the user is alerted in some way; in a present embodiment, alerting is executed by the mobile terminal with an audible signal, such as by beeping or ringing. In other embodiments it may be highlighting on the display, vibrating the mobile terminal, etc. The process then returns to await receipt of a new message at block 402.

If the user acknowledges the banner (as, in the present exemplary embodiment, by depressing the asterisk key which denotes MORE), the process proceeds from block 410 to block 412, where message body 14 is displayed on mobile terminal 100, along with legends SAVE and DISCARD (FIG. 3D). If the user selects SAVE, the process proceeds from block 414 to block 416, where a check is performed as to whether there is sufficient space in which to save the message; if not, the process proceeds to block 418 and the oldest message presently in the buffer is deleted. At block 420 the message is saved. The process then waits for receipt of a new message at block 402.

To ensure that the user gets a sensible indication each time a message of interest is received, the mobile terminal 100 may optionally include a thesaurus or dictionary of possible keywords, or such a thesaurus or dictionary may reside in a network server and be available to the mobile terminal 100.

Such a thesaurus or dictionary may be used to generate additional keywords that are related to a keyword provided by the user. A merchant originating a message 10 may have a different mindset than a user, and might enter different keywords 12-1 for some particular item than a user might enter in the user's local keyword list 40. For example, a menswear merchant, wanting to advertise a sale on pants, might provide PANTS and TROUSERS for keywords 12-1, while a prospective purchaser might enter that the user is looking for SLACKS. That user would not be alerted to this sale, which might feature pants the user would be happy to purchase. A thesaurus capability, upon entry of SLACKS by the user, might append keyword list 40 to further include the synonyms PANTS, CHINOS, and TROUSERS, in which case the user who entered SLACKS is alerted to the sale, irrespective of the user's facility with the local language and knowledge of synonyms.

An alternative embodiment of the invention is practiced in a digital television receiver or a mediascreen or even a mobile terminal having capabilities of receiving signals from a digital video broadcast (DVB) system. Textual content is broadcast over the DVB system in a recurring manner. For example, reports of current prices for several hundred stocks may cycle repetitively while the stock exchange is open for trading, or scores from games in a sports league might be broadcast once each predetermined number of minutes while the games are in progress. Other transmission methods might be contemplated for transmitting such information to users, but a broadcast method such as DVB is quite suitable when a large number of users in a coverage area may all have requested a type of content transmission. All the users who have requested a particular type receive it simultaneously. But each user typically has certain portions of the content in which the user is particularly interested. For example, a user may have requested to receive scores from National Hockey League games, but may have particular interest in the Detroit Redwings. Or a user may have requested to receive stock prices from the NYSE, but may own stock in General Motors and Nokia, and thus has particular interest in the reports of those stocks.

Figure 5:
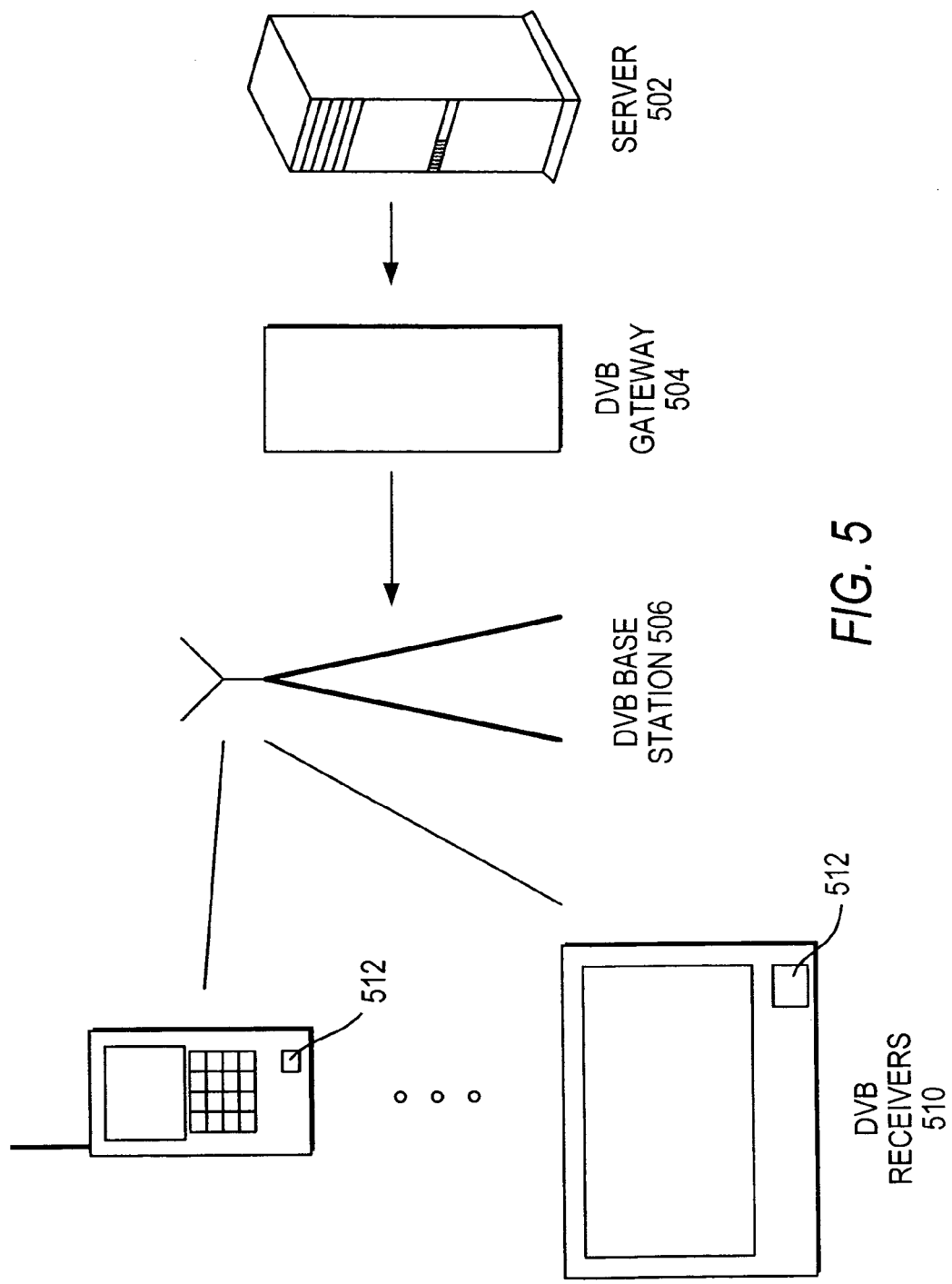
FIG. 5 is a block diagram of a DVB system incorporating one embodiment of the present invention.

FIG. 5 illustrates a DVB system embodying the present invention. A content updating server 502 provides updated content (e.g., current sports scores, current stock prices) to DVB gateway 504, which in turn forwards it (typically combined with other content from other sources, not shown) to DVB base station 506. It is transmitted from DVB base station 506 to a plurality of user terminals 510 in base station 506's coverage area. A user terminal 510 may be any terminal capable of receiving a DVB broadcast.

FIGS. 6A and 6B are snapshots of an information display at the bottom of the display screen on a DVB terminal 510 according to the present invention. In FIG. 6A, scores from the National Hockey League are scrolling across the bottom of the display on a terminal 510. Since the user has entered "Redwings" as one of the user's keywords of interest in a keyword list like keywords 40 of FIG. 2, the Detroit Redwings score is flagged to the user in some way, as by causing the terminal to issue a beep or ring, or by visual highlighting. In an aspect of this embodiment, a user terminal 510 is equipped with a dedicated button 512 for requesting display of additional information concerning the display item presently being flagged to the user. For example, if a user presses button 512 while the Detroit Redwings score is being flagged to him, the user typically receives a display indicating further details of the game, including the names of players who scored goals, current time remaining in the game, etc. The score portion corresponds to Banner 12-2 of FIG. 1, and the additional display corresponds to body 14.

FIG. 6B is a snapshot of a stock price display scrolling along the bottom of a screen on a user terminal 510. The user has entered "General Motors" and "Nokia" as keywords denoting items in which the user is interested, so those items are flagged to him, again by some audible signal or by visual highlighting or both.

According to yet another embodiment of the invention, the invention may also be practiced in, for example, a wireless application protocol (WAP) environment wherein mobile terminals access the Internet through WAP gateways. Clients may request ("pull") content. The Wireless Application Protocol Forum's *WAP 1.2 Specification Suite* also supports "pushing" of content. WAP browsing of the Internet differs from the conventional Hypertext Text Transfer Protocol (HTTP) browsing of the Internet, as practiced on desktop PCs, in that WAP protocol does not support the use of "cookies" in the terminal (client) device, which impart the ability to keep track of user preferences.

Instead of directly pushing all of the content to the client, a Service Loading (SL) push may be used. Service loading sends a Uniform Resource Locator (URL) to the client and the client uses the URL to retrieve data from the Internet with a traditional pull. Another variation is a Service Indication (SI) push, in which the user is presented with a link and the user may choose to load the linked data, or the user may ignore the link.

In the WAP/SMS environment, nine types of content may be pushed to the client, shown in Table 1.

TABLE 1

| CONTENT TYPE | MIME |
| --- | --- |
| SMS text message | Text/plain |
| Virtual Calendar version 1.0 | Text/x-vCalendar |
| Virtual Card version 2.1 | Text/x-vCard |
| WML | Text/x-wap.wml |
| WML Script | Text/x-wap.wmlscript |
| Compiled WML | Application/x-wap.wmlc |
| Compiled WMLScript | Application/s-wap.wmlscriptc |
| WBMP | Image/x-wap.wbmp |
| Certificates | x-wap.wtls-ca-certificate |

MIME (Multipurpose Internet Mail Extensions) define the content and format of transmitted data. MIME instructs applications on how to handle non-US-ASCII text data. The MIME information is stored in the MIME header, which precedes the data content. The MIME standard is defined in Internet Engineering Task Force RFC 2045-2049.

Short Message Service (SMS) text messages are non-formatted plain-text messages. They are technically limited to 160 characters, but some devices support multi-part SMS messages. The messages use the GSM character set, which is a 7-bit ANSI-based character code that supports international characters. SMS messages may also be used as a bearer for data packets, in which case the data is in 8-bit format and the data package can hold 140 octets. The system confirms successfully received SMS messages to the SMS service center, even though the message may later be discarded.

Virtual Calendars (vCalendars) are calendar and scheduling objects. Virtual Cards (vCards) are electronic business cards. Virtual Cards and Virtual Calendars will be referred to herein as vObjects. vObjects are plain-text messages. Virtual Messages (vMessages) and Virtual Notes (vNotes) are also vObjects, but they will not be discussed herein because they do not yet have MIME specifications and can not be transmitted over the Internet in a standardized fashion.

Wireless Markup Language (WML) decks and WML Scripts may be compiled or plain-text. The WML is compiled by replacing often-used tags with short binary tokens. To reduce the load on the wireless network, compiled WML decks and WML Scripts are preferred. WML Scripts must always be accompanied by a WML deck, which calls a WML Script function.

Wireless bitmaps (WBMPs) comprise one-bit black-or-white entities which collectively form an image. Although, WBMPs may be viewed independently, they are often embedded in a WML card.

Certificates are used to initiate Wireless Transport Layer Security (WTLS) sessions. Certificates may also be used to encrypt/sign data using the WML Script Cryptographic Library. If a certificate is pushed to a client, it must be accompanied by a WML deck and WML Script.

VObjects are software independent objects, which may be sent by E-mail or downloaded from the Internet. The WAP user's Internet provider or operator may send vObjects as a value-added service. VObjects could be requested from the server, which searches the Internet for the requested content. Web page and Internet application servers could be used as push initiators to send vObjects to certain WAP devices. For example, a web page may have a button entitled "send vCard to GSM". The user enters the GSM number of a WAP-enabled device. The web page's script or application then sends the vCard to the operator. The country and operator code are used to route the message to the correct operator. The operator then pushes the content to the WAP client.

VObjects are included in the BLUETOOTH standard. VObjects can be transmitted using the OBEX protocol or using generic IP packets. The *BLUETOOTH Object Push Profile* specifies how vObjects may be pushed using the OBEX protocol. A PC with a BLUETOOTH transponder and a WAP client with a BLUETOOTH transponder could exchange vObjects using a pushing scheme. The vObjects may either be pushed from the PC to the WAP client or from the WAP client to the PC. For example, a PC user may receive a vCard, which has either been attached to an E-mail or automatically downloaded from a web page. The default application for this file type launches a Service Discovery application to find nearby WAP devices. If such devices were found, the application asks if the user wishes to push the vCard to the WAP device. If the user wishes to push the vCard, the application sends the vCard using either the OBEX or generic IP packet, depending on the WAP client's features.

Many WAP enabled devices, such as WAP mobile phones, have calendars and phone/address books. Therefore, integration of vObjects into these devices would improve the usability and diversity of these devices. The WAP device's user should be presented with an option to save a vCard to its address book or a vCalendar entry to its calendar. VObjects are integrated into widespread software packages, such as Netscape's Messenger and Microsoft's Outlook. Hence, vObject pushing would provide an essential bridge between WAP and PC devices.

Service Loaded (SL) content is, in most cases, more expensive to the user than direct pushed content. After the SL prompt is received, the user must pull the content from the server. The user must pay either for the data packets (GPRS bearer) or for the air time (connection-based bearers). A convenient feature would be the ability to disable the automatic loading of SL push content or filter which messages are loaded.

The Wireless Application Protocol Forum's *Wireless Application Protocol Service Loading Specification* instructs manufacturers to make client devices in which the SL service may be disabled. A better scheme would be that the SL prompts are converted into SI type links. Unfortunately SL prompts only contain the URL of the content to be retrieved. Unlike the SI messages, the SL prompts do not contain an "Info" field. The label for the link is generated from the URL. Either the URL file name or the domain name may be used. The link label is also the message title.

WAP clients have severe restrictions on their hardware capabilities. Since handheld devices must conserve battery power, the CPU power of the devices is limited. WAP clients have small displays, which must be observed when designing an ergonomic user interface. New technology WAP enabled Personal Digital Assistants (PDAs) have relatively large displays, but typical mobile phones can display only 3 to 8 lines of text at a time.

Figure 7:
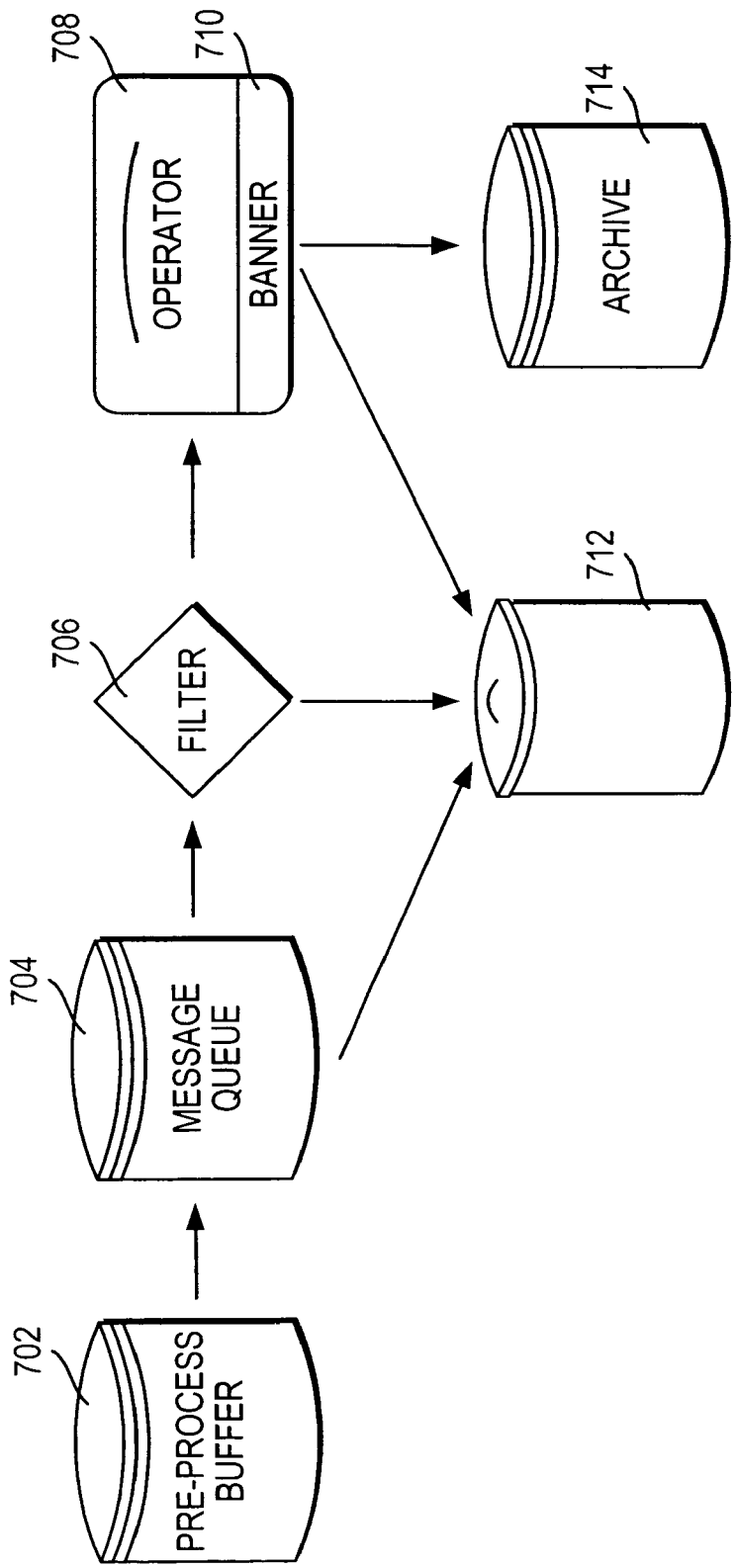
FIG. 7 is a flow diagram of operations in a WAP terminal according to one embodiment of the present invention.

Referring to FIG. 7, the push message data packets and push message SMS messages are routed, on arrival, to a preprocess buffer 702. The messages are in their native format with all headers intact. A message queuing process moves data from the pre-process buffer to the message queue 704. Since all WAP data is packet-based, the queuing process waits for all of the packets to appear in the pre-process buffer before reconstructing the push messages. If the push messages are sent by SMS, the queuing process strips the SMS wrapper. After all of the fragments, which reside in individual SMS messages, are received the queuing process reconstructs the message. If automatic SL is disabled, the SL prompt is converted into a link before the message is moved into the message queue.

All messages in the message queue have a common header type, regardless of the push message type or the message bearer. The header includes the title of the message, a consecutive sequence number, the message type and the address of the sender. The header also includes three time stamps: the time when the message arrived at the terminal, the creation time of the message, and the message's expiration time. Some of the fields may remain blank depending on the message type.

An SI message includes two time fields: a creation time and an expiration time. The SI message's "Created" field is transferred to the "Creation Time" field of the common header. The SI message's "si-expires" field is transferred to the common header's "Expire Time" field. The common header's "Title field" is filled with the SI message's message string. The common header's "Message sender" field is filled with the address of the push initiator from the header of the push message.

A direct push or a push retrieved from a SL message may contain a generic HTTP header. The Wireless Application Protocol Forum's *Wireless Application Protocol Push Message Specification* specifies that a push message may optionally contain a generic header conforming to the HTTP 1.1 standard. Some of the fields of the common header may be filled using information from the generic header. The generic header's "Last-Modified" field is transferred to the common header's "Creation time" field. The generic header's "Expires" field is transferred to the "Expire time" field. The common header's "Message sender" field may either be filled with the address of the push initiator from the push message header or with the address from the "From" field of the generic header.

An SMS text message includes a mandatory SMS header. The SMS header includes a "TP Service Center Time Stamp", which identifies when the SMS service center has received the message This time stamp is transferred to the "Creation Time" field of the common header. Although SMS text messages are sent with a "Validity-Period" field, this is stripped by the SMS service center and is not relayed to the user terminal. Therefore, the "Expire Time" field of the common header is left blank. The SMS header has a "TP Originating Address" field which contains the sender's telephone number, which is transferred to the "Message Sender" field of the common header. If the user terminal contains a phone book in which the sender's phone number is listed, the corresponding name entry from the phone book is used in the "Title" field of the common header. Otherwise, the sender's phone number is used in the "Title" field.

The common header contents for various message types is summarized in Table 2.

TABLE 2

| | Title | Seq. Number | Mess. Type | Mess. Sender | Arrival Time | Creation Time | Expire Time |
|---|---|---|---|---|---|---|---|
| Direct Push | Yes | Yes | Yes | Yes | Yes | Maybe | Maybe |
| Service Indication | Yes | Yes | Yes | Yes | Yes | Yes | Yes |
| Service Loading (Link) | Yes | Yes | Yes | Yes | Yes | No | No |
| Service Loading (Retrieved) | Yes | Yes | Yes | Yes | Yes | Maybe | Maybe |
| SMS Text Message | Yes | Yes | Yes | Yes | Yes | Yes | No |

Figure 8:
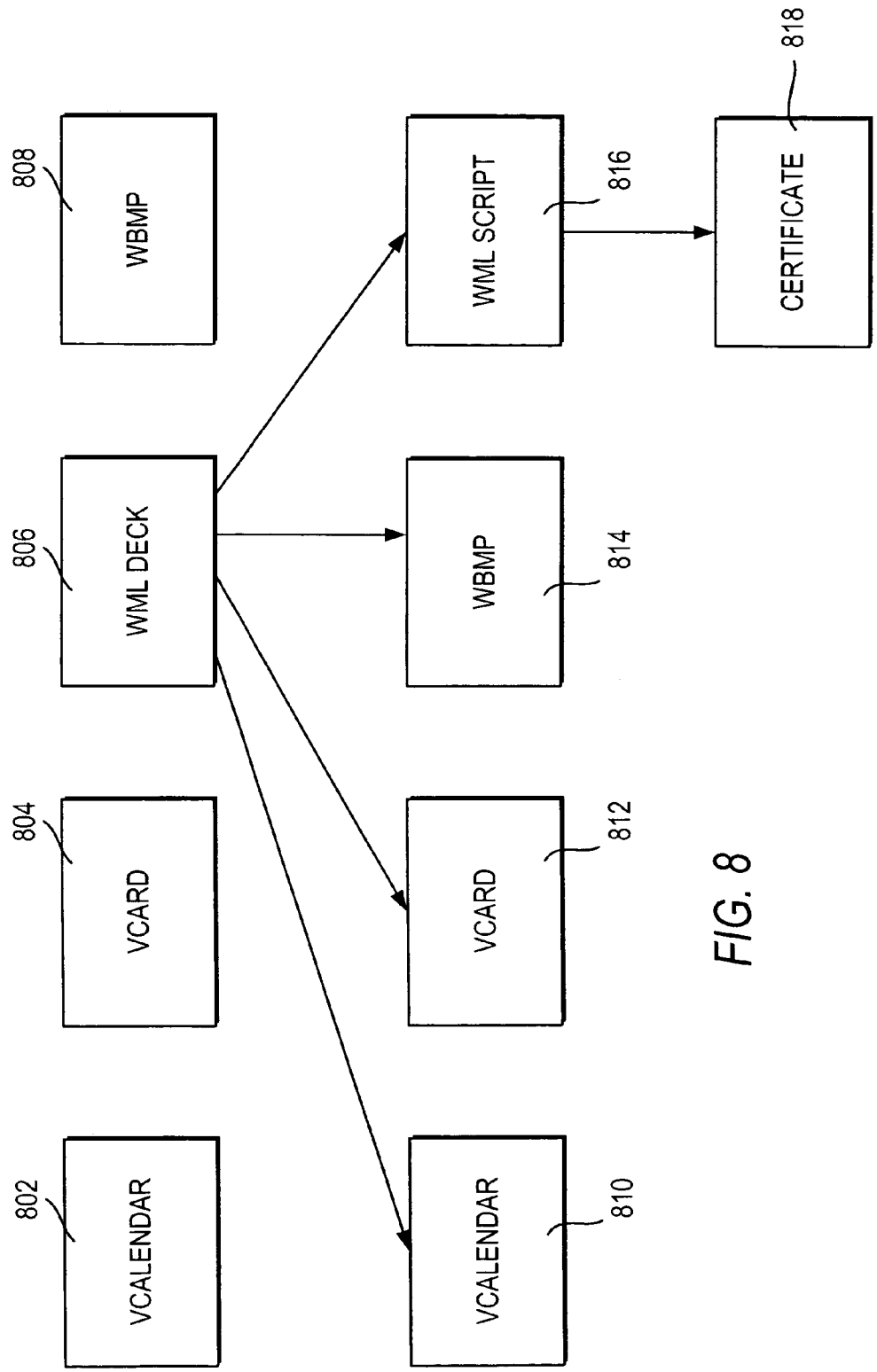
FIG. 8 illustrates a thread hierarchy of WAP messages according to one embodiment of the present invention.

The next step is to resolve the interdependencies of the content in the message queue. Referring to FIG. 8, a WAP browser can display vCalendars 802, vCards 804, WML decks 806, and WBMPs 808. WML Scripts 816 must always be accompanied by a WML deck 806, and certificates 818 must always be accompanied by both a WML Script 816 and a WML deck 806. The content is grouped into content threads. The threads are given names which are displayed in the WAP client's banner 710. Displaying of the thread names is not illustrated.

The most common thread is a WML deck 804. A WML deck may have links to vCalendars 810, vCards 812, WML Scripts 816, WBMPs 808, as well as to other WML decks 806. Every content object that is linked to a WML deck appears only in that WML deck's content thread. WML cards may or may not have titles. If the first card in the deck has a title, this title is used as the content thread's name. Otherwise the name is formed from the sender's address and/or the arrival time.

If a vCalendar 802, 810 or a vCard 804, 812 is directly pushed, it does not have a URL. If a vCalendar or vCard is obtained through SL, its URL ends in VCS or VCF, respectively. vCalendars 810 or vCards 812 are accompanied by a WML deck 806, with a link that points to vCalendar 810 or vCard 812 through either a local or full path URL. Every time a vObject is received using SL, the WML decks 806 in the message queue 704 must be searched for any occurrences of the vObject's URL. If an appropriate link is found, the WML deck and the vObjects form a content thread. Otherwise the vObjects form their own content thread. The vObjects have a "Name" field, which may or may not be filled in. If it is filled in and the object forms an independent thread, the thread name is taken from the "Name" field. Otherwise the thread name is formed from the sender's address and/or the arrival time.

Certificates 818 must be called from WML Scripts 616. Every time a certificate 818 is received, the application searches for its corresponding WML Script 816. If an appropriate WML Script 816 is not found, the certificate is discarded. Likewise, if a WML Script 816 is received, the application searches for a WML deck 806 that calls the WML Script 816. If a call to the WML Script 816 is not found, the WML Script 816 is discarded. Certificates and WML Scripts may never form independent threads.

A WBMP 808 may or may not be embedded in a WML card. Therefore, when a WBMP 808 is received, a corresponding WML deck 806 is sought. If an appropriate WML deck 806 is found, the WBMP 808 is added to the WML deck 806's thread; otherwise the WBMP 808 forms it own thread. If the independent WBMP 808 was sent using SL, the thread name is formed from the URL. If the independent WBMP was sent using a direct push, the name is either formed from the sender's address and/or the arrival time.

SMS text messages always form their own threads, with the thread name being taken from the Title field of the common header.

Old and expired messages should be automatically discarded. SI messages have an "Expiration time" field and when this time elapses the message should be removed from the message queue 704. Content received from a direct push or SL pull may or may not contain a generic HTTP header with an "Expiration time" field. This date/time is designed to tell a browser when the content shall no longer be retrieved from its cache memory. The client device should discard the content and optionally retrieve a newer version of the content from the server. The client may also have a maximum storage time, after which messages are removed from the message queue. The application should periodically check the arrival time from the common header of the content and if a predetermined period of time has elapsed, the whole thread is removed. The client should check that there are no duplicate messages in the message queue. If two or more content threads have the same name and sender, the older threads should be discarded. vCalendar entries may have events that occur at a set date or that occur periodically until a certain date. After this date, the vCalendar entry shall be considered expired and the message should be removed. An exception is a message with multiple entries, which is removed after all of the entries expire.

An intelligent filter 706 is used to discard unwanted content from message queue 704. The same filter may be used to decide which action should be taken when SL prompts are received. The SL prompt may be discarded, the content may be automatically received or the prompt may be converted into a link. The filters may be applied to all content types or only certain content types. Different content types may have different filter profiles. The user may wish to discard all content from a certain sender or domain. Conversely, the user may wish to only receive content from certain senders and discard all content from other senders.

The content thread's "Name" field can be used to include or exclude certain threads. The words in the "Name" field can be compared to a keyword list. For instance, if a user is subjected to junk vCalendar messages from a store, such as "SUMMARY: Mega-Sale at Music Corner DTSTART: 20001030T080000", the user may wish to exclude all vCalendars with the word "sale" in the "Name" field. These keywords may also be used to search for words in WML cards. For instance, the same user may wish to exclude WML decks with the words "Music Corner".

The content filter requires an ergonomic keyword editor. A preferred editor is presented in the form of a table, with separate columns for the include/exclude rule, the key words, the content type and the sender. An example of such a table is presented in Table 3. The order of the entries dictates the priority of the rule. For instance, in the example of Table 3, all SL prompts from "nokia.fi" and "nokia.com" are automatically loaded and all others are converted into links.

TABLE 3

Example keyword editor

| Rule | Words | Content Type | Sender |
|---|---|---|---|
| − | Sale | V calendar | * |
| − | Music Corner | * | * |
| + | * | SL - automatic load | Nokia.fi |

TABLE 3-continued

Example keyword editor

| Rule | Words | Content Type | Sender |
|---|---|---|---|
| + | * | SL - automatic load | Nokia.com |
| + | * | SL - link | * |

The client device has a scrolling banner that displays the titles of the messages in the message queue. The messages may be sorted according to one of the three time fields in the common header or the message titles may be placed in alphabetical order. The client device may be configured to give an audible indication when new content is received. In an aspect of the invention, the client device has a button 512 dedicated to showing the message associated with the text currently displayed in the banner. It is convenient if this button is operational even when the keypad is locked. The same button may be used to change to the next message or load a SI or modified SL link.

Once the user has viewed a message, she may either discard or keep the message. If she chooses to keep the message, she may move the thread to an archive folder 714 or keep it in the message queue. If the user chooses to discard the message, the whole thread is erased, including all linked objects, represented by trashcan 712.

Thus, the one user interface on a wireless device serves to filter pushed messages of both BLUETOOTH and WAP origin. All pushed messages are presented to the user, at least in summary form in the banner of the graphical user interface. The summary for WAP SL messages may take the form of a URL which the user may request to open. The summary for WAP SI messages may take the form of a link from which the user may request downloading of further content. SL messages may be converted to SI messages, reducing load on the transmission medium.

Figure 9:
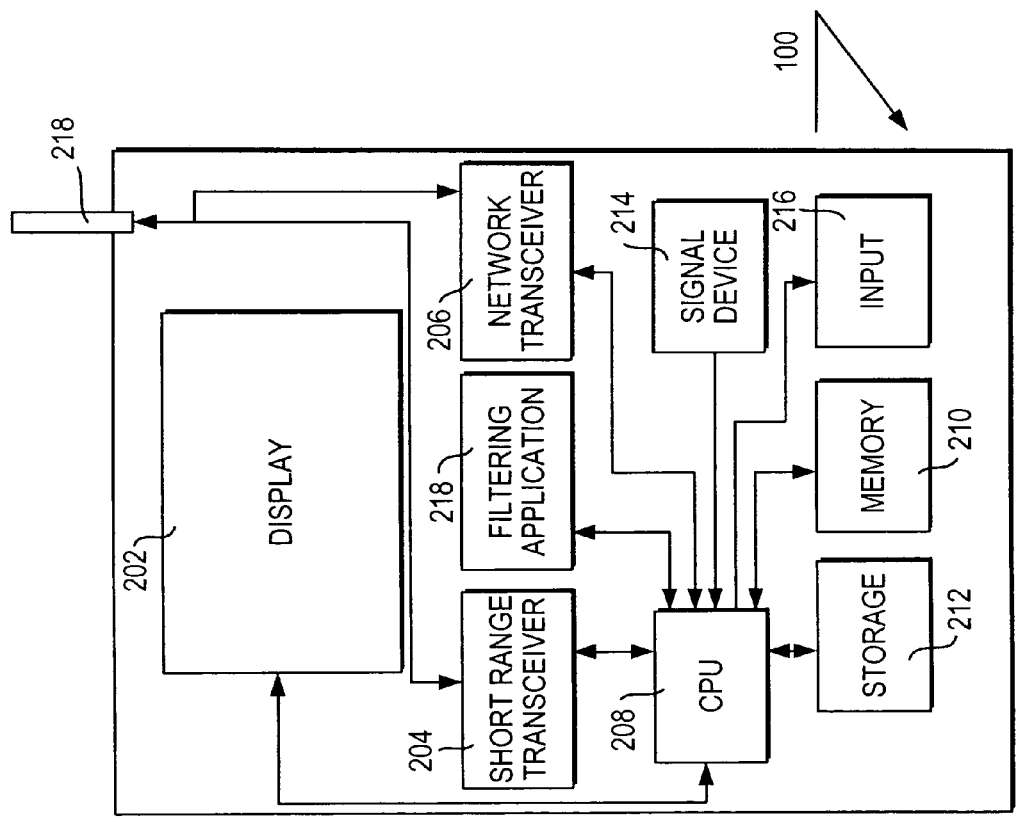
FIG. 9 is a block diagram of one embodiment of a mobile terminal for use with the present invention.

FIG. 9 is a block diagram of an embodiment of a mobile terminal 100 that may be used with the present invention. An antenna 218 is multiplexed to both a network transceiver 206 for operation in a mobile telephone network, and a short-range transceiver 204 for use in the short-range network of the present invention. Both transceivers are connected to a CPU 208. Also connected to CPU 208 are a signal device 214 (a device for producing sensible rings, beeps, or vibrations), an input device 216 (a complement of pushbuttons, including a telephone keypad), memory device 210, storage device 212, and display 202.

Filtering application 218 may, as a design choice, be embodied in hardware, firmware, or software. (If software, it can be resident within memory 210 or storage 212.) Filtering application 218 filters incoming calls according to keywords entered by the user (as through input device 216) and stored in memory 210 or storage 212. According to the results of filtering, a sensible indication regarding an incoming message may be provided to a user of mobile terminal 100. If user-entered keywords match a portion of an incoming message, signal device 214 may produce an audible sound and the message as displayed on display 202 may be visually highlighted. If there is no match between user-entered keywords and an incoming message, the message may be displayed on display 202 in a de-emphasized manner ("grayed out"), or portions of the message may be omitted from display.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for a user of a mobile terminal to receive information in a short-range communication from a local information source, the method comprising the steps of:
   maintaining, on the mobile terminal, filter data indicative of information the mobile terminal user is desirous of viewing;
   receiving, by the mobile terminal, the short-range communication from the local information source, wherein the short-range communication comprises a message and communication data indicative of the nature of information in the short-range communication;
   displaying on a display of the mobile terminal at least a portion of the message in the short range communication;
   performing, by the mobile terminal, a comparison between the communication data and the filter data according to a predetermined criteria; and
   providing, by the mobile terminal, a sensible indication to the mobile terminal user if predetermined criteria between the communication data and the filter data are met within the comparison,
   wherein the short-range communication comprises a body and a header, wherein the body comprises the message, wherein the header comprises a banner and at least one keyword, and wherein the at least one keyword comprises the communication data indicative of the nature of information in the short-range communication.

2. The method of claim 1, wherein the short-range communication comprises a low-power transmission within a range of about 0.01 meters to 10 meters.

3. The method of claim 1, wherein the receiving the short-range communication comprises receiving the short-range communication from the local information source which comprises at least one of a retail store and a shopping mall equipped with a short-range transmitter.

4. The method of claim 3, wherein the receiving the short-range communication comprises a low-power communication transmitted within a range of about 0.1 meters to 10 meters.

5. The method of claim 1, wherein the mobile telephone is capable of receiving both short-range communication and communications from a network of the mobile telephone.

6. The method of claim 1, wherein:
   the filter data comprises first keywords;
   the communication data comprises second keywords;
   the predetermined criteria are deemed met when any first keywords match any second keywords; and
   the sensible indication is at least one of:
   sounding an audible signal;
   emphasizing at least a portion of the displayed portion of the message; and causing the mobile terminal to vibrate.

7. The method of claim 1, wherein:
   the filter data comprises first keywords;
   the communication data comprises second keywords;
   the predetermined criteria are deemed met when no first keywords match any second keywords; and
   the sensible indication is de-emphasizing at least a portion of the displayed portion of the message.

8. The method of claim 1, wherein the displayed portion of the message is the entire message.

9. The method of claim 1, further comprising the step of:
   taking, in response to a predetermined indication from the user, an action regarding the message.

10. The method of claim 9, wherein the displayed portion of the message is less than the entire message, and the action is to display the entire message.

11. The method of claim 9, wherein the predetermined indication comprises pressing a button on the mobile terminal.

12. The method of claim 9, further comprising the step of:
    displaying a prompt informing the user of at least one of the predetermined indication and the action which can be taken regarding the message.

13. The method of claim 12, wherein the prompt comprises an indicia representing a button on the mobile terminal.

14. The method of claim 12, wherein the prompt comprises an indicia informing the user that more of the message remains to be displayed.

15. The method of claim 12, wherein the prompt comprises an indicia informing the user of the action which can be taken regarding the message.

16. The method of claim 9, wherein the mobile terminal is a mobile telephone and the action is to dial a telephone number contained in the short-range communication.

17. The method of claim 9, wherein the action is to store at least a portion of the short-range communication in the mobile terminal.

18. The method of claim 1, wherein the displayed portion of the message is less than the entire message, further comprising the steps of:
    displaying, in response to a first predetermined indication from the user, the entire message; and
    taking, in response to a second predetermined indication from the user, an action regarding the message.

19. The method of claim 18, further comprising the steps of:
    displaying a first prompt informing the user that more of the message remains to be displayed; and
    displaying a second prompt informing the user of at least one of the second predetermined indication and the action which can be taken regarding the message.

20. The method of claim 1, further comprising the step of:
    displaying a filter datum of the filter data, wherein the predetermined criteria was met in the comparison between said filter datum and a topic datum of the communication data.

21. The method of claim 1, further comprising the step of:
    entering, by the user, the filter data into the mobile terminal.

22. The method of claim 21, wherein the step of entering the filter data comprises the step of:
    downloading the filter data from another device into the mobile terminal.

23. The method of claim 21, wherein the step of entering the filter data comprises the step of:
    using a keyboard or keypad of the mobile terminal to enter the filter data into the mobile terminal.

24. The method of claim 21, wherein the filter data comprises keywords.

25. The method of claim 24, further comprising the step of:
generating additional keywords related to the keywords entered by the user.

26. The method of claim 25, wherein the step of generating additional keywords is performed by a thesaurus and/or dictionary module.

27. The method of claim 26, wherein the generating additional keywords is performed at the mobile terminal.

28. The method of claim 26, wherein the generating additional keywords is performed at a network accessible by the mobile terminal.

29. The method of claim 28, wherein the thesaurus and/or dictionary module is located in at least one of the mobile terminal and a network accessible by the mobile terminal.

30. The method of claim 1, wherein the communication data indicative of the nature of information in the short-range communication comprises header information in the short-range communication.

31. The method of claim 30, wherein the performed comparison is between at least one field of the header information and the filter data.

32. The method of claim 1, wherein the communication data indicative of the nature of information in the short-range communication comprises the message in the short-range communication.

33. The method of claim 32, wherein the comparison performed is between the message in the short-range communication and the filter data.

34. The method of claim 1, wherein the predetermined criteria depends upon contents of the short-range communication.

35. The method of claim 1, wherein the predetermined criteria depends upon a type of the short-range communication.

36. The method of claim 1, wherein the predetermined criteria depends upon a sender of the short-range communication.

37. A mobile terminal of a user comprising:
a processor;
an input device connected to the processor;
a storage device connected to the processor for storing at least filter data indicative of information the mobile terminal user is desirous of viewing;
a short-range transceiver connected to the processor for receiving a short-range communication comprising a message and communication data indicative of the nature of information in the short-range communication, wherein said short-range communication is received from a local information source;
a display connected to the processor for displaying at least a portion of the message; and
filter software operative on the processor for:
directing to the display at least a portion of the message;
performing a comparison between the communication data and the filter data stored on the storage device; and
causing an indication sensible by the mobile terminal user if predetermined criteria between the communication data and the filter data are met within the comparison,
wherein the short-range communication comprises a body and a header, wherein the body comprises the message, wherein the header comprises a banner and at least one keyword, and wherein the at least one keyword comprises the communication data indicative of the nature of information in the short-range communication.

38. The mobile terminal of claim 37, wherein the short-range transceiver comprises a transceiver that receives low-power signals transmitted, from the local information source, within a range of about 0.01 meters to 10 meters.

39. The mobile terminal of claim 37, further comprising:
a mobile network transceiver connected to the processor for receiving communications from a mobile network of the mobile terminal.

40. The mobile terminal of claim 37, wherein the local information source comprises at least one of a retail store and a shopping mall equipped with a short-range transmitter.

41. The mobile terminal of claim 40, wherein the short-range transmitter comprises a transmitter which transmits low-power signals within a range of about 0.01 meters to 10 meters.

42. The mobile terminal of claim 37, wherein the mobile terminal comprises one of a personal data assistant (PDA) and a portable computer.

43. The mobile terminal of claim 37, wherein the mobile terminal comprises a mobile telephone.

44. The mobile terminal of claim 43, wherein the mobile telephone is capable of receiving both short-range communication and communications from a network of the mobile telephone.

45. The mobile terminal of claim 37, wherein the filter software is operative for taking, in response to a predetermined indication from the user, an action regarding the message.

46. The mobile terminal of claim 45, wherein the displayed portion of the message is less than the entire message, and the action is to display the entire message.

47. The mobile terminal of claim 45, wherein the user interacts with the input device of the mobile terminal to make the predetermined indication.

48. The mobile terminal of claim 47, wherein the input device comprises at least one of a keyboard and a keypad.

49. The mobile terminal of claim 45, wherein the mobile terminal is a mobile telephone and the action is to dial a telephone number contained in the short-range communication.

50. The mobile terminal of claim 45, wherein the action is to store at least a portion of the short-range communication in the mobile terminal.

51. The mobile terminal of claim 37, wherein a filter datum of the filter data is displayed on the display, when the predetermined criteria was met in the comparison between said filter datum and a topic datum of the communication data.

52. The mobile terminal of claim 37, wherein the input device is used to enter the filter data into the mobile terminal.

53. The mobile terminal of claim 37, further comprising:
means for downloading the filter data from another device into the mobile terminal.

54. The mobile terminal of claim 53, wherein the means for downloading comprises the filter software.

55. The mobile terminal of claim 37, wherein the input device comprises:
a keyboard or keypad of the mobile terminal.

56. The mobile terminal of claim 37, wherein the filter data comprises keywords.

57. The mobile terminal of claim 56, further comprising:
a generator of additional keywords related to the keywords comprising the filter data.

58. The mobile terminal of claim 57, wherein the generator of additional keywords comprises:
a thesaurus and/or dictionary module.

59. A system in a mobile terminal for identifying matches between information a user of the mobile terminal is desirous of viewing and a received short-range communication comprising a message and communication data indicative of the nature of information in the short-range communication, the system comprising:
a processor;
a storage device;
a display; and
software means operative on the processor for:
maintaining in the storage device a database of keywords identifying the information the mobile terminal user is desirous of viewing;
displaying at least a portion of the message in the short-range communication;
scanning the communication data in the short-range communication to find matches between the communication data and the keywords stored in the storage device; and
providing a sensible indication to the mobile terminal user if predetermined criteria between the communication data and the keywords are met,
wherein the short-range communication comprises a body and a header, wherein the body comprises the message, wherein the header comprises a banner and at least one keyword, and wherein the at least one keyword comprises the communication data indicative of the nature of information in the short-range communication.

60. The system of claim 59, wherein the short-range communication comprises a low-power communication transmitted within a range of about 0.01 meters to 10 meters.

61. The system of claim 59, wherein the local information source comprises at least one of a retail store and a shopping mall equipped with a short-range transmitter.

62. The system of claim 61, wherein the short-range transmitter transmits low-power signals within a range of about 0.01 meters to 10 meters.

63. The system of claim 59, wherein the mobile terminal comprises a mobile telephone.

64. The system of claim 63, wherein the mobile telephone is capable of receiving both short-range communication and communications from a network of the mobile telephone.

65. The system of claim 59, wherein the software means is operative for taking, in response to a predetermined indication from the user, an action regarding the message.

66. The system of claim 61, wherein the displayed portion of the message is less than the entire message, and the action is to display the entire message.

67. The system of claim 61, wherein the mobile terminal is a mobile telephone and the action is to dial a telephone number contained in the short-range communication.

68. The system of claim 61, wherein the action is to store at least a portion of the short-range communication in the mobile terminal.

69. The system of claim 59, wherein a filter datum of the filter data is displayed on the display, when the predetermined criteria was met in the comparison between said filter datum and a topic datum of the communication data.

70. The system of claim 59, wherein the filter data comprises keywords.

71. The system of claim 66, wherein the software means is operative for generating additional keywords related to the keywords comprising the filter data.

* * * * *